Jan. 12, 1954

J. NOALL 2,665,527

BRAKE BLOCK CUTTER

Filed June 9, 1952

INVENTOR.
JOHN NOALL
BY
Ely, Frye & Hamilton
ATTORNEYS

INVENTOR.
JOHN NOALL

Jan. 12, 1954
J. NOALL
2,665,527
BRAKE BLOCK CUTTER
Filed June 9, 1952
5 Sheets-Sheet 4
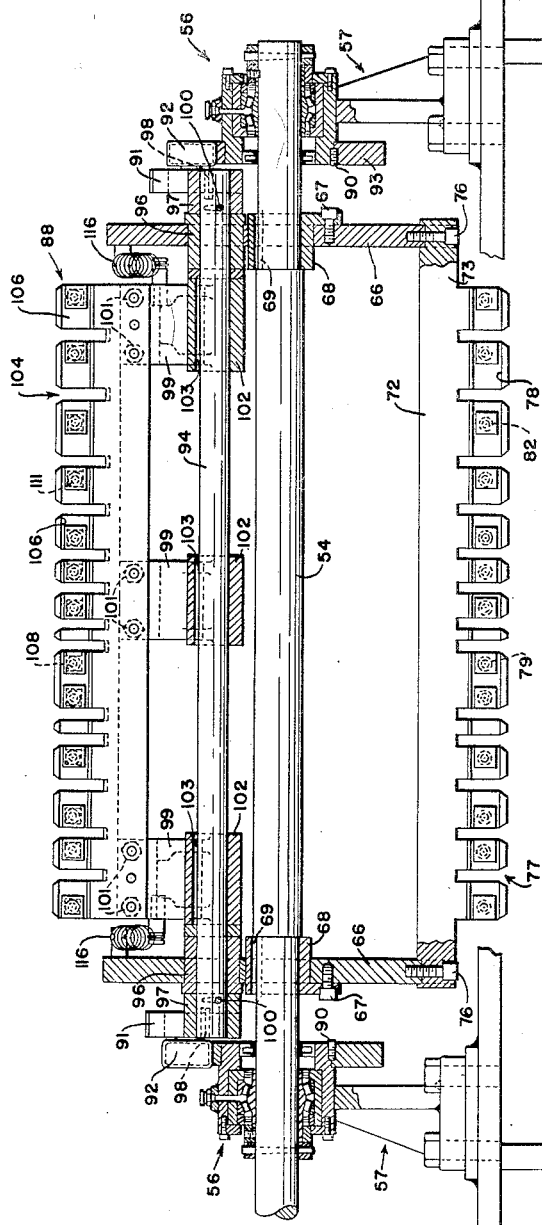
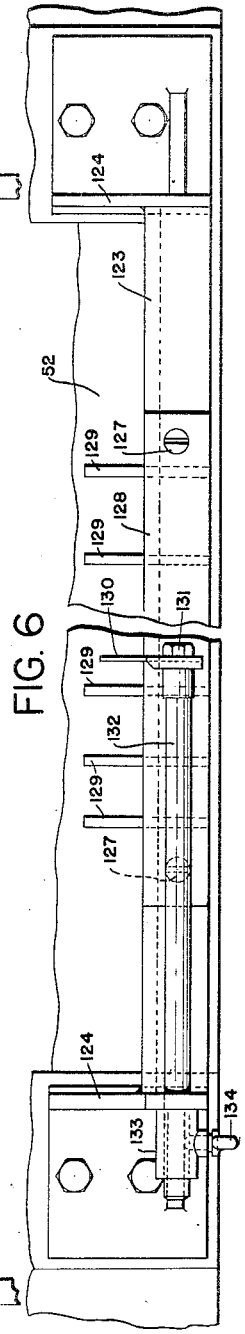
INVENTOR.
JOHN NOALL
BY *Ely, Frye & Hamilton*
ATTORNEYS INVENTOR.
JOHN NOALL
BY Ely, Frye & Hamilton
ATTORNEYS Patented Jan. 12, 1954

2,665,527

UNITED STATES PATENT OFFICE 2,665,527

BRAKE BLOCK CUTTER

John Noall, Akron, Ohio, assignor to The Firestone Tire & Rubber Company, Akron, Ohio, a corporation of Ohio Application June 9, 1952, Serial No. 292,501

2 Claims. (Cl. 51—108)

This invention relates to a cutting machine, and in particular to a machine for gang-cutting a length of material having the form of a segment of a cylinder. The machine shown and described above is specially designed for cutting segmented blocks of brake lining, but the invention is not limited to this particular field, because the principles thereof may be applied to other analogous purposes.

Heretofore, such cutting has been done with an individual saw, such as a band saw or circular saw. Due to the arcuate form of the work, and its length, this process has been laborious and time-consuming, and the finished work has not been consistent or reliable as to dimensions.

By the present invention, the said difficulties have been obviated by a cylindrical or drum-form feeder, having a plurality of clamping stations which automatically pick up and clamp the arcuate workpiece, pass it through a gang-cutter, and release the cut pieces.

It is therefore an object of the invention to provide an improved cutting means for subdividing work pieces. More particularly, it is an object to provide a drum-form feed for a cutter for subdividing workpieces which is automatic and continuous in operation. In still greater particularity, it is an object to provide a drum-form feed for a cutting machine which automatically clamps and unclamps the workpieces. Yet another object is to provide a drum-form feed for gang-cutters having clamps with clearance means for the cutters. A related object is to provide a pick-up station for workpieces which station affords clearance for work-clamping means.

These and other ends are attained by the invention, a preferred form of which is described in the following specification and illustrated in the drawings, in which:

Fig. 4 is an elevational view of elements located centrally of Fig. 1, enlarged and partly in section, Fig. 6 is a top plan view of a front portion of Fig. 1, taken along the line 6—6 therein.

Figure 1:
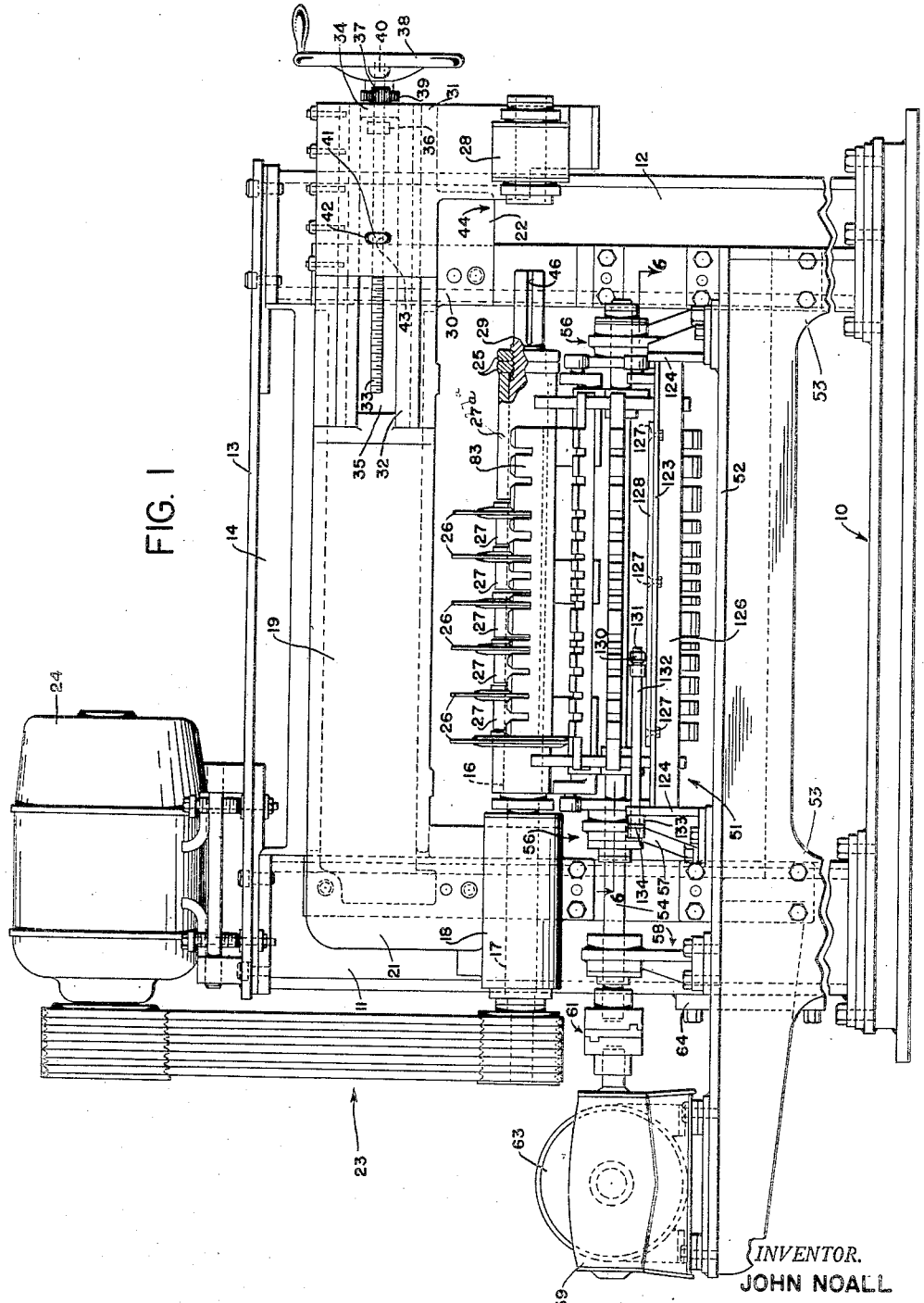
Fig. 1 is a front elevation of the machine, partly in section.
Figure 3:
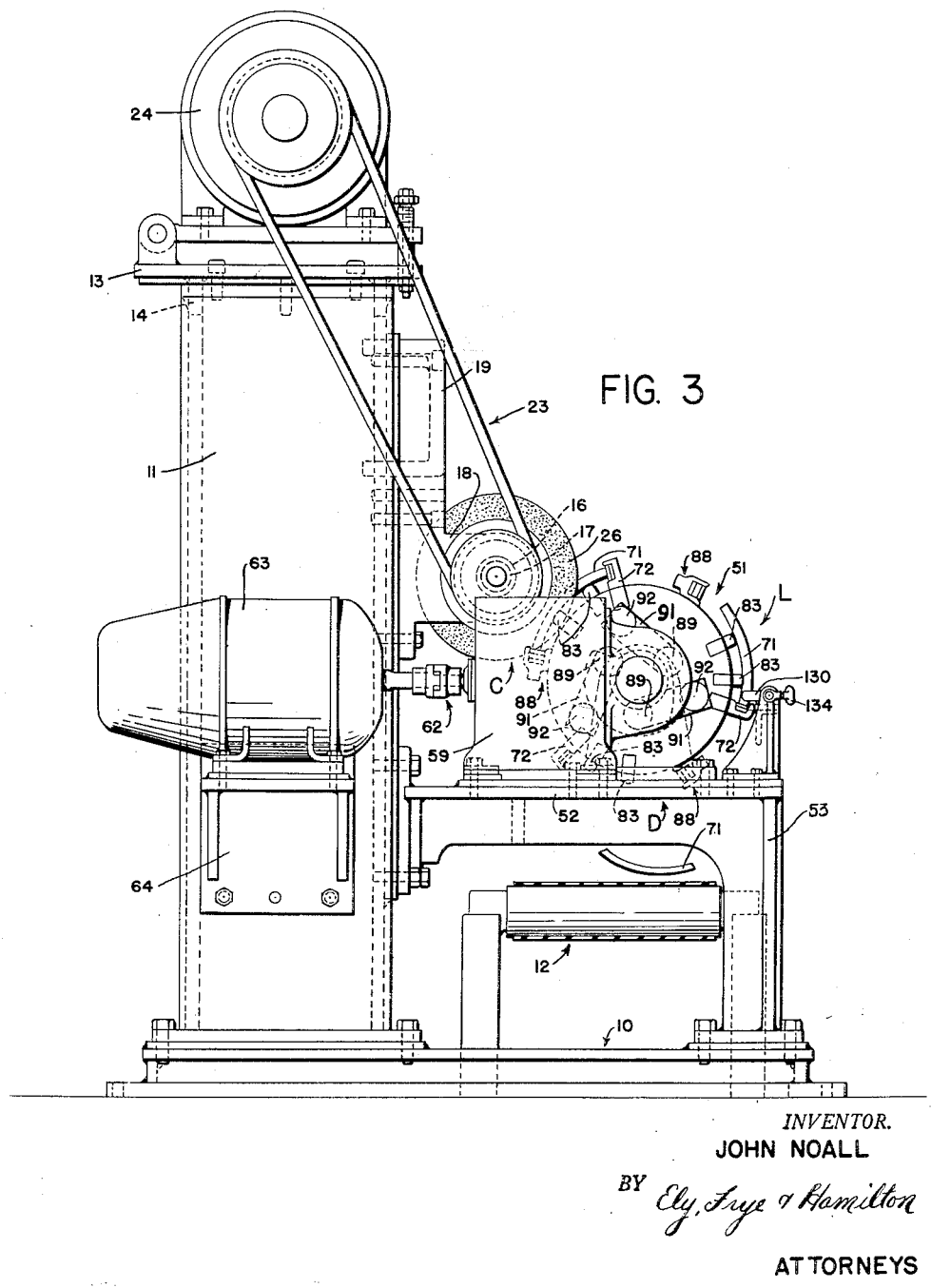
Fig. 3 is an end elevational view taken from the left of Fig. 1.

Referring to the drawings by characters of reference, there is shown generally at 10 in Figs. 1 and 3 a base member supporting the entire machine. A pair of sturdy, rectangular uprights 11, 12 of hollow construction mounted on the base 10, and joined at their upper ends by a spanning plate 13 with a reinforcing flange 14, provide support for the saw system and the two motors employed.

The sawing or cutting unit is mounted on a rotating shaft 16 having a reduced end 17 journaled in a bearing block 18. The latter is an integral part of a casting 19 spanning the machine framework and having depending end portions 21, 22, the former of which carries the bearing block 18. A belt and pulley arrangement, indicated generally by the numeral 23, communicates rotation to the saw shaft 16 from a motor 24, bolted to the top plate 13.

Figure 2:
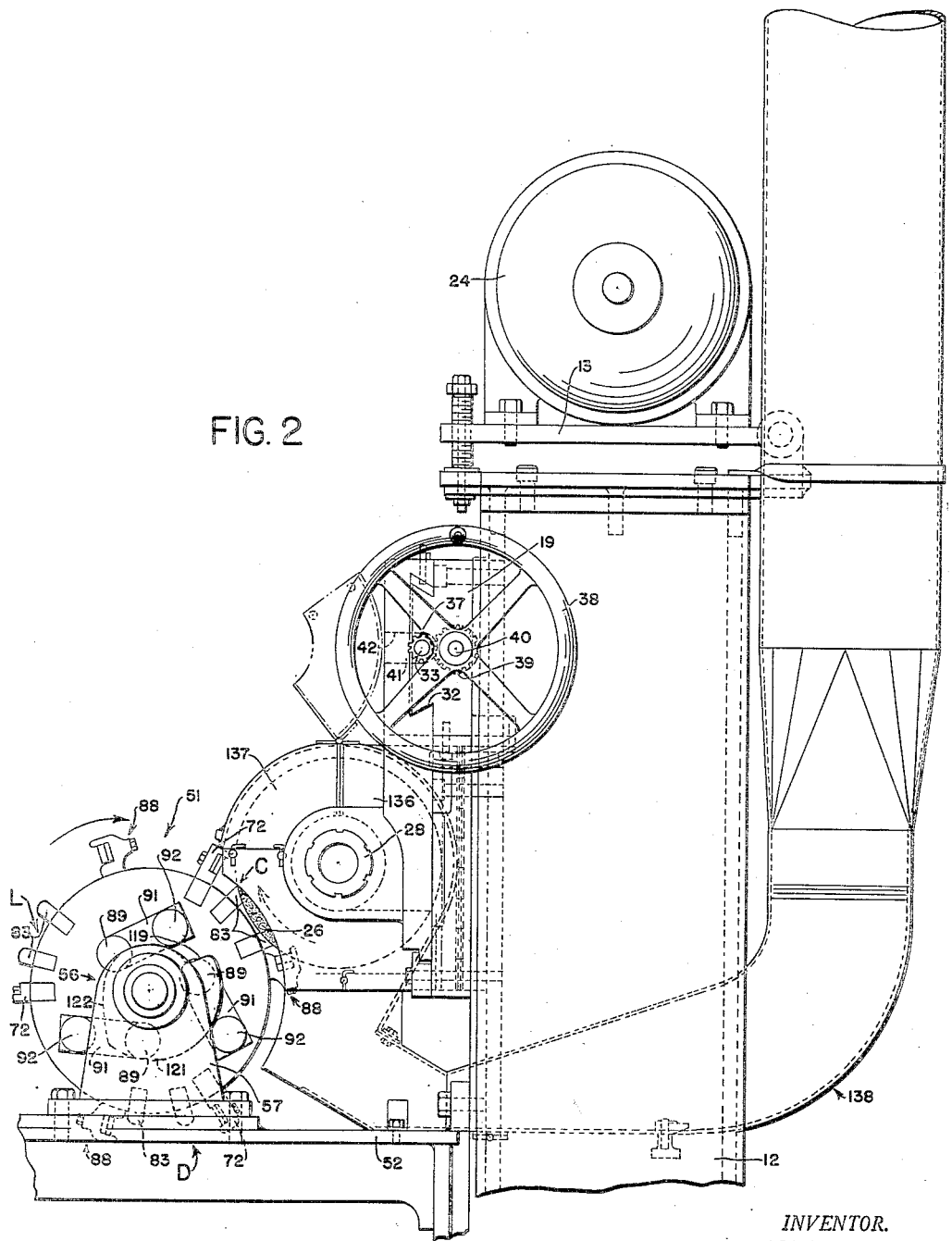
Fig. 2 is an end elevational view taken from the right of Fig. 1.

The cutting discs 26, of carborundum or the like, in any desired number, are keyed to shaft 16 and are located in proper spaced position along the shafts by a plurality of collars such as the collar indicated by the numeral 27, the assembly being held by lock nuts 25. In Fig. 1 the full complement of collars is not employed, and a spacer sleeve 27a transmits pressure from the lock nuts to the assembly. In the operation of the machine the arrangement of the cutting discs will be varied, to suit different forms of workpieces operated on, and to this end the journal support for the right end (Fig. 1) of shaft 16 is arranged for movement axially away from the shaft so that the discs and collars may be removed and replaced. Thus the right end journal 28 for the right end 29 of shaft 16 is carried as an integral part of a carriage 31 having a dovetail channel slidably mounted on a complementary dovetail rib 32 (Fig. 2) formed on the casting 19. A screw 33 has outboard bearing in a web 34 integral with casting 19 and spanning a channel 35 in the casting at the end thereof, and is anchored by a collar 36 on its inner side and a pinion 37 on its outer side. A handwheel 38, rotatably carried on a stud 40 in the end of casting 19 carries a gear 39 meshing with pinion 37 whereby screw 33 is rotated upon rotation of the handwheel. This rotation is converted into sliding motion of carriage 31 by means of a nut comprising a bar 41 inserted in an opening 42 in the face of the carriage and into channel 35 of casting 19, and having a threaded transverse bore 43 receiving the screw 33.

The journal 28 houses a conventional anti-friction bearing 44 having a sleeve associated with the inner race, and said sleeve having pins for interengagement with a pair of oppositely disposed keyways 46 on the end 29 of shaft 16.

The feeding drum, indicated as a whole by the numeral 51 is supported adjacent the cutting discs on a table 52 (Fig. 3) having outer legs 53 which are bolted to base 10, the table being bolted on its rear side to uprights 11, 12. Drum 51 is carried on a shaft 54 (Fig. 4) journaled on either side of the drum in roller bearing units 56 supported on uprights 57 bolted to table 52. An auxiliary upright 58 (Fig. 1) supports an extension of shaft 54, and the latter is connected to a speed reducer 59 through a coupling 61. As seen in Fig. 3, speed reducer 59 is connected by a coupling 62 to a motor 63 supported on a bracket 64 bolted to upright 11. Thus, rotation of motor 63 causes low speed rotation of shaft 54 and feeding drum 51 to the cutting discs.

Figure 5:
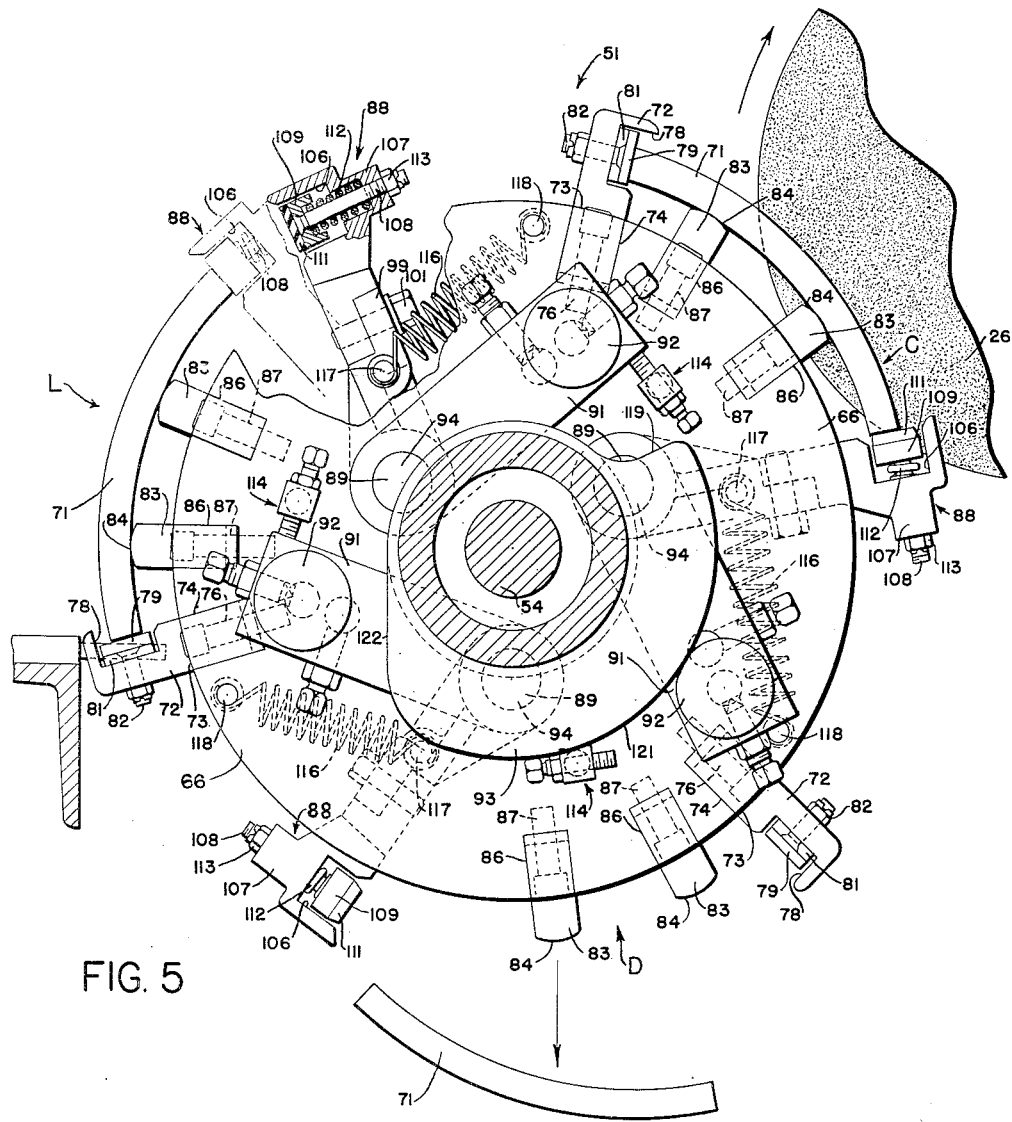
Fig. 5 is an enlarged view of the feed drum unit located at the lower, left corner of Fig. 2.

Referring to the feeding drum in particular, it will be seen from Figs. 4 and 5 that the same comprises end discs 66 secured by bolts 67 to flanged tubes 68, which latter are secured to shaft 54 by keys 69. Since the end discs and their associated structures are mirror images of one another, only one need be described.

Generally speaking, the purpose of drum 51 is to receive the work pieces and hold them in clamped relation while revolving them past the cutting discs, and then to release the cut pieces. To accomplish this, the drum has three clamping stations in peripherally spaced relation, each station having a stationary clamp and a movable clamp. Since the three clamping structures are identical, only one need be described, and for this purpose, reference is had to the clamping structure at the loading position to the left of Fig. 5, wherein the workpiece is indicated by the numeral 71.

The stationary clamp 72 comprises a plate with shouldered ends 73 received in radial notches 74 in the peripheries of discs 66, and secured therein by bolts 76, the arrangement being such that about half of plate 72 lies radially outwardly of the peripheries of the discs. In this outward portion, plate 72 is provided with a series of radial notches, one of which is indicated by the numeral 77 (Fig. 4), which notches provide clearance for cutting discs 26 in the rotation of the feed drum. It will be understood that plates such as 72 may be provided having various notch patterns to correspond with the particular spacing arrangement of cutting discs employed.

The outwardly extending sections of plate 72 between notches 77 are provided with aligned channels 78 for receiving the bottom edge of workpiece 71. In order to avoid injury to the workpiece and allow for irregularities thereof, a buffer or cushion is provided in the bottoms of channels 78, comprising rubber pads such as the pad 79, the pad being vulcanized or riveted to a metal plate 81 secured by a bolt 82 to clamp 72.

Spacing members 83 are provided to properly locate the workpiece 71 for engagement by the clamps. These members 83, which have rounded, outer edges 84 are radially arranged, similarly to plate 72, being received in radial notches 86 in the disc 66 and secured by bolts 87.

The movable clamping arm, indicated generally by the numeral 88, constitutes one arm of a bell crank, arranged for oscillation on a center 89, the other arm 91 of the bell crank carrying, near its outer end, a cam-follower roller 92 arranged to cooperate with a cam 93, the latter being carried on bearing block 56 and secured against rotation by a set screw 90.

As best seen in Fig. 4, the bell crank center is embodied in a shaft 94, spanning the feeding drum and journaled in bushing sleeves 96 secured in discs 66. It will be seen that the arm 88 comprises a unit extending between discs 66 and that the bell crank arm 91 is duplicated on the two ends of the feeding drum, each having a hub 97 secured by a key 98 to the end of shaft 94. Only one of the cam and clamp systems need be described.

Each arm 88 which is in the form of a plate arranged parallel to the axis of the shaft 54 is secured for oscillation with shaft 94 by means of a series of three plates 99 secured by bolts 101 to plate 88, and each having an integral sleeve 102 received on shaft 94, and secured against rotation with respect thereto by means of a key 103. It will be noted also that bell crank arm 91 is secured to shaft 94 by means of a tapered pin 100. Each plate 88 is provided with notches 104 similar to notches 77 to clear the cutting discs, and also has channels 106 similar to channels 78, although somewhat deeper to provide for a movable cushion, this being necessitated by the unyielding nature of the cam action. Thus, the outwardly extending sections of plate 88 are each provided with a boss 107 having a bore, slidably receiving a bolt 108 on the outer end of which is a plate 109 to which is attached a rubber, cushioning strip 111. A spring 112 surrounding bolt 108 holds the cushion normally in a position outwardly of channel 106 against the outer, headed end of the bolt as determined by the setting of a holding nut 113 on the bolt. An adjustable screw stop 114 carried on disc 66 limits clockwise (Fig. 5) rotation of the bell crank, and in this position arm 88 is in non-clamping position, as shown in full lines in Fig. 5, being urged to this position, when the follower roller 92 is not actuated by cam 93, by a tension coil spring 116 secured to a post 117 on outer plate 99 and to a post 118 on the inside face of disc 66.

Assuming the machine to be running, a workpiece 71 is placed on clamp 72 at a loading station indicated by the letter L. As the feeding drum rotates, the workpiece rests under its own weight on the outer edges 84 of spacer plates 86 and is thus properly located for engagement with the gripping members in the channels 106 of movable clamp 88. During this rotation, and before the workpiece reaches the top of its cycle, follower roller 92 engages an abrupt rise 119 on the periphery of cam 93 and the bell crank is thus rotated counterclockwise, bringing the clamp cushion 111 into firm, holding engagement with the leading edge of workpiece 71. At this phase the bell crank has swung sufficiently so that follower roller 92 may clear the periphery 121 of the cam having maximum radius. This periphery is of sufficient extent that the workpiece remains clamped during the cutting operation, which takes place generally in a region indicated by the letter C. Following the cutting operation the workpiece is carried to a station indicated by the letter D, at the lower part of Fig. 5, at which follower roller 92 meets a decline 122 in the cam periphery, and spring 116 urges arm 88 to non-clamping position, whereupon the cut pieces drop by gravity onto a conveyer 120, and are carried to a disposal point.

For convenience in mounting the workpieces on the feed drum, a pick-up station is provided. This, as shown in Figs. 1 and 6, comprises a horizontal bridge plate 123 located parallel to and in front of the feed drum and welded to a pair of end standards 124 bolted to table 52. The bridge plate, located in spaced relation above the table top, has a depending vertical reinforcing plate 126. Dwelling on plate 123 and secured by screws 127 is a plate 128 having embedded pins 129 protruding from its edge in the direction of the feed drum, the said pins being spaced in a pattern to permit passage of the outer edges of several clamp members of the feed drum.

In loading, the lower edge of a workpiece is placed on the pins 129 and permitted to fall against the feed drum. After a set of movable clamps 88 has passed the top edge of the workpiece, the latter falls against the positioning bars 83. Following this, a set of stationary clamps 72 clears pins 129 and picks up the workpiece.

A series of plates 128 are provided corresponding to the various sets of clamp members mentioned above.

Proper positioning of the workpiece on the pick-up station is easily effected by means of a stop plate 130 secured by a nut 131 on the end of an adjustable, cantilever rod 132 slidably mounted in a bushing 133 welded to left hand upright 124, the rod being secured in position by a thumb screw 134 threaded through bushing 133.

Operation

The workpiece 71, which may be of asbestos composition or other suitable material for brake linings are supplied in cylindrical segments of a length capable of being subdivided into a number of brake lining segments. These may be of the same or varying widths. Assuming a situation where a change in the width pattern is required, the cutter discs 26 must be rearranged. To this end, the handwheel 38 is rotated counterclockwise to move carriage 31 to the right, thus moving bearing 28 off shaft end 29. After removal of lock nuts 25, the series of cutting discs and collars may be slid off shaft 16, and replaced in a manner to provide the proper spacing, and bearing 28 replaced on the shaft by rotation of the handwheel. It should be noted that clamp arms 88, 72 may be replaced for each different arrangement of the discs. Preferably, however, these changes will be so patterned that they may cooperate with several predetermined disc arrangements. This is the case shown in the drawings.

With both motors running, the cutting discs are rotating at relatively high speed, while the feed drum is rotating at a rate of about 1 to 3 R. P. M. After one of the movable clamp sets 88 has passed the loading station, the operator sets the bottom edge of a workpiece on the pins 129 of the pick-up station, and slides it to the left until the end of the piece makes contact with stop plate 130. The operator then releases the workpiece, which then dwells against the feed drum under its own weight. After the movable clamp has passed the top edge of the workpiece, the latter dwells upon locator bars 83 in proper position for engagement with movable clamp 58 and with the cutting discs. When the following stationary clamp 72 reaches the bottom edge of the workpiece, the latter is picked up so as to rotate with the feed drum. Shortly thereafter, the follower roller 92 on bell crank arm 91 of the movable clamp system contacts rise 119 on cam 93 and revolution of the outer end of movable clamp 88 is substantially stopped, so that the said clamp is brought into clamping relation to the leading edge of the workpiece. This is followed by contact of the said leading edge with the gang-cutters and as the feed drum continues to rotate, the workpiece is severed into the several pieces of the desired width.

After passing the saw, the cut pieces remain in clamped relation until they assume a position at the bottom of the feed drum, at which station the follower 42 drops radially inward along declivity 122 of the cam, and movable clamp 88 moves away from the cut pieces under the influence of spring 116, whereupon the cut pieces drop onto conveyer 120 and are carried to a disposal point.

The provision of three sets of clamps permits of continuous operation, with loading, cutting and release occurring substantially simultaneously.

In order to handle the dust arising in the cutter operation, the cutters are covered with a cylindrical hood 136 (Fig. 2), with a hinged cover 137, and the dust is removed through a blower duct indicated generally by the numeral 138.

While a certain preferred embodiment of the invention has been shown and described, the same is not to be deemed as limited thereby, since various changes in the size, shape, character and arrangement, for instance, of the various elements may be made without, however, departing from the spirit or scope of the appended claims.

What is claimed is:

1. A cutting machine for sub-dividing a cylindrically curved longitudinal blank into a plurality of blocks, comprising a rotary gang-saw having spaced cutting discs, a rotatable drum having a cylindrical supporting surface adapted to receive and support said blank with the curved surface of said blank substantially co-axial with the axis of rotation of said drum, a plurality of sets of jaws adapted to receive successive blanks and clamp them in place on said drum while said blanks are being cut transversely by said discs and to release said cut blocks after said cutting operation, each set of jaws comprising a bar extending longitudinally of said drum and fixed thereto and having a radially extending surface providing a seat for one edge of said blank, a second bar extending parallel to said first bar and having a radially extending surface adapted to provide a seat for the other edge of said blank, means responsive to rotation of said drum to move said second bar toward said first bar to clamp said blank therebetween during the cutting operation and to release said blank after the cutting operation, said bars and the surface of said drum being grooved to provide clearance for said cutting discs whereby said blank may be completely severed into said plurality of blocks while being firmly clamped.

2. A cutting machine for sub-dividing a cylindrically curved longitudinal blank into a plurality of blocks, comprising a rotary gang-saw having spaced cutting discs, a rotatable drum having a cylindrical supporting surface adapted to receive and support said blank with the curved surface of said blank substantially co-axial with the axis of rotation of said drum, a plurality of sets of jaws adapted to receive successive blanks and clamp them in place on said drum while said blanks are being cut transversely by said discs and to release said cut blocks after said cutting operation, each set of jaws comprising a bar extending longitudinally of said drum and fixed thereto and having a radially extending surface providing a seat for one edge of said blank, a second bar extending parallel to said first bar and having a radially extending resilient surface adapted to provide a seat for the other edge of said blank, cam means responsive to rotation of said drum to swing said second bar toward said fixed bar to clamp said blank therebetween during the cutting operation and to swing said second bar away from the fixed bar to release said blank after the cutting operation, said bars and the surface of said drum being grooved to provide clearance for said cutting discs whereby said blank may be completely severed into said plurality of blocks while being firmly clamped.

JOHN NOALL.

References Cited in the file of this patent
UNITED STATES PATENTS

| Number | Name | Date |
| --- | --- | --- |
| 1,384,756 | Hambuechen | July 19, 1921 |
| 1,926,974 | Einstein | Sept. 12, 1933 |
| 1,974,696 | Swanson | Sept. 25, 1934 |
| 2,554,830 | Klett | May 29, 1951 |